May 3, 1938. E. THYS 2,116,006
HOP AND STEM SEPARATOR
Filed June 17, 1936 2 Sheets-Sheet 1

INVENTOR.
Edouard Thys.
BY
Chas. E. Townsend.
ATTORNEY.

May 3, 1938. E. THYS 2,116,006
HOP AND STEM SEPARATOR
Filed June 17, 1936 2 Sheets-Sheet 2

INVENTOR.
Edouard Thys.
BY Chas. E. Townsend.
ATTORNEY.

Patented May 3, 1938

2,116,006

UNITED STATES PATENT OFFICE 2,116,006

HOP AND STEM SEPARATOR

Edouard Thys, San Francisco, Calif.

Application June 17, 1936, Serial No. 85,715

2 Claims. (Cl. 209—92)

This invention relates to separating machines and especially to a machine for separating stems from hops.

The picking of hops by means of machinery is now a comparatively old art as machine picking has been in continuous use on a comparatively large scale in California and other States, at least since 1910. The type of machine generally employed consists of a series of revolving drums from the surface of which project V-shaped flexible wire fingers. The vines to be picked are passed over and under the drums by a conveyor and as the vines pass over and under the drums they are combed by the V-shaped fingers and the hops are removed during the combing operation. A great many leaves and stems are also removed and some of the hops are broken, thereby forming petals, hence after the picking operation has been completed it becomes necessary to separate the hops from the leaves, petals and stems, as the cleaner the hops, the higher the market value of the same.

In actual practice one type of machine is employed for separating the leaves and petals from the hops and another type is employed for separating the stems from the hops. Again, machines are employed which attempt to separate in one operation both the leaves, petals and stems from the hops.

The object of the present invention is generally to improve and simplify the construction and operation of separators; to provide a separator which is particularly intended for separating stems from hops; and more specifically stated, to provide an inclined endless conveyor having trough-shaped members extending crosswise thereof, said troughs being divided into small pockets and said pockets being so shaped that the hops when deposited on the conveyor will settle in the bottom portion of the pockets while the stems will stand endwise and project upwardly from the pockets or lie on the surface thereof in a position where they can be readily removed by a revolving brush under which the conveyor travels.

The separator is shown by way of illustration in the accompanying drawings, in which—

Figure 1:
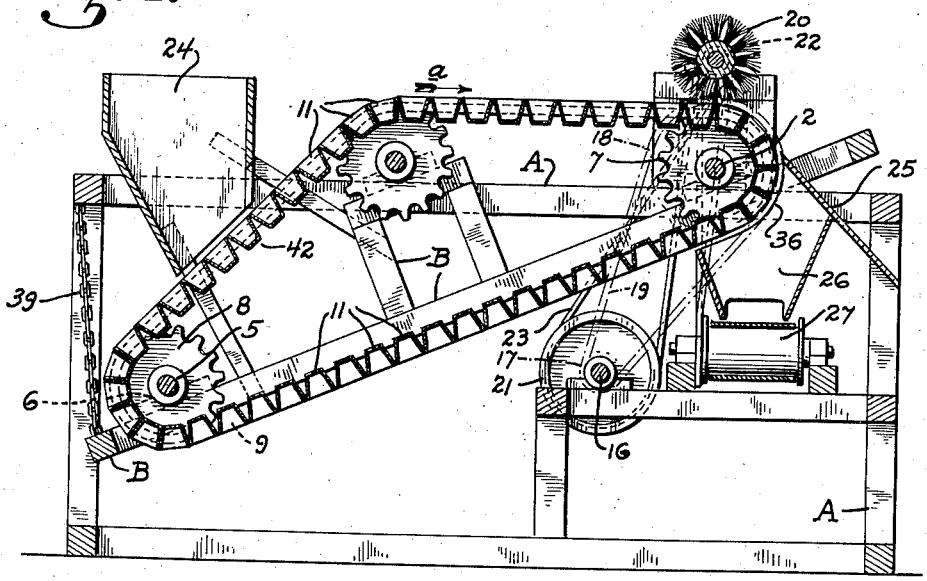
Fig. 1 is a central, vertical section in side elevation of the hop and stem separating machine.
Figure 4:
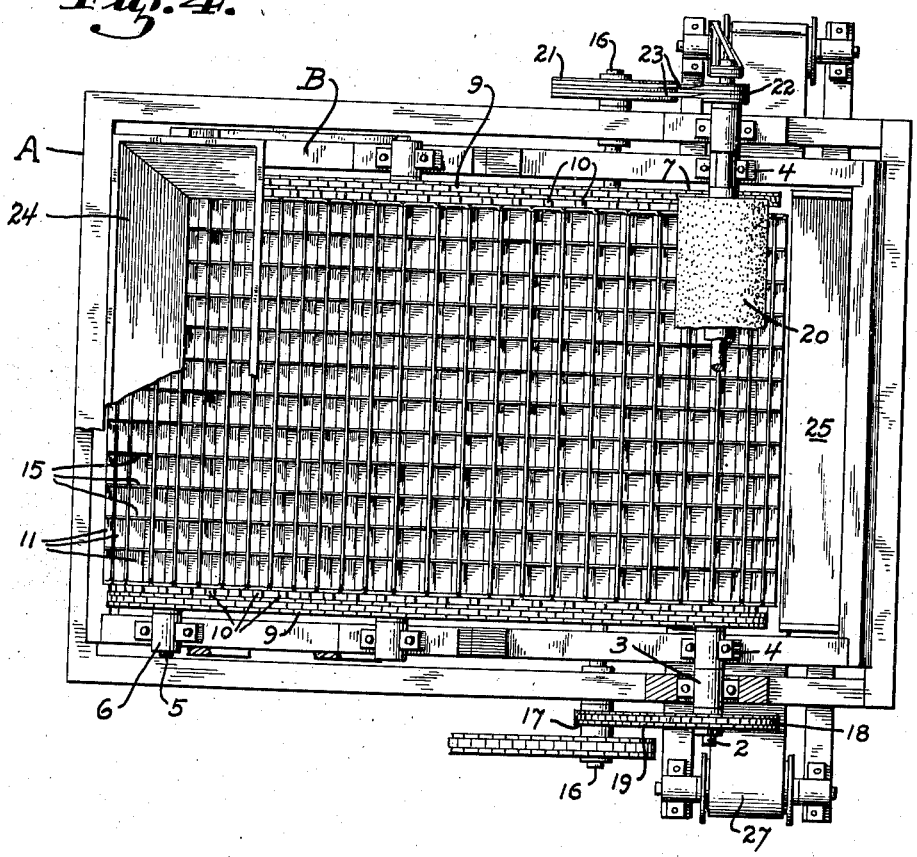
Fig. 4 is a plan view of the machine partially broken away.

Referring to the drawings in detail, and particularly Figs. 1 and 4, A indicates a main frame across which extends a shaft 2 which is supported in bearings 3—3. Hung from the shaft by hangers are bearings 4—4 and free to swing thereon is a frame B, and extending crosswise of the lower end of the frame is a shaft 5 which is journaled in bearings 6—6.

Secured on opposite ends of the shaft 2 within the frame B are a pair of sprocket gears 7—7 and similarly secured on shaft 5 are a pair of sprocket gears 8—8. The respective sprockets align with each other and carry endless chains 9 on the sides of which are formed lugs 10 to which are secured trough-shaped members 11 extending crosswise between the chains.

The bottoms of the troughs are of less width than the open ends, thereby providing sloping sides and spaces between the troughs which permit them to close together as the chains pass around the sprockets. The leading edge of each trough is hook-shaped, as indicated at 14, and extends over the trailing edge of an adjacent trough, thereby closing the space between the troughs and preventing any foreign matter from lodging between them. Also, it should be noted that each trough is divided longitudinally into a series of pockets by plates 15, this being an important feature as will hereinafter appear.

The chains, together with the troughs secured between them, form an endless conveyor which is continuously driven when the separator is in operation, the conveyor being driven from a drive shaft 16 through the sprocket gears 17 and 18 and a chain 19 carried thereby. A brush 20 is mounted directly above the high point of the conveyor and this is also continuously driven from the drive shaft 16 by pulleys 21 and 22 and a belt 23.

Figure 2:
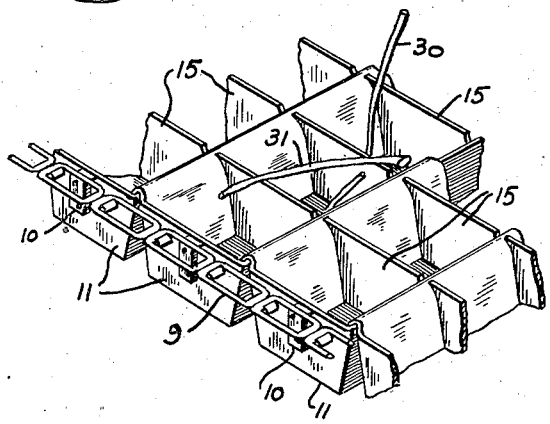
Fig. 2 is a perspective view of the troughs extending between the chains and the partition members whereby the troughs are divided into a series of pockets, said view also showing the position assumed by the stems.
Figure 3:
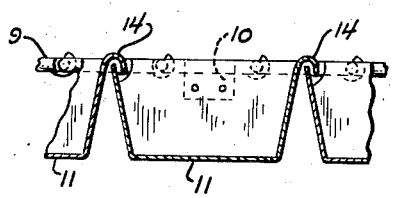
Fig. 3 is an enlarged cross section of one trough and the ends of two adjacent troughs.

The hops and stems to be separated are delivered to the conveyor through a hopper 24. The stems removed by the revolving brush are delivered into a discharge chute 25 and the clean hops are delivered to a hopper 26 and an endless conveyor 27. In actual practice the hops delivered by the hopper 24 drop into and settle in the pockets formed by the partition plates, while the stems tend to stand on end and project out of the pockets, as indicated at 30 in Fig. 2, or they will rest on top of the partition plates as indicated at 31 or will lie crosswise of the troughs. As the conveyor travels in the direction of arrow a, each trough, with the pocket formed therein, will pass beneath the revolving brush and the stems will be engaged thereby and thrown into the discharge chute 25. The hops, on the other hand, rest in the pockets and as such are not touched by the brush and they will, accordingly, pass on to the point 36, where the troughs or pockets assume an inverted position and they are thus discharged by gravity into the hopper from which they are removed by the conveyor.

In actual practice it has been found that the inclination of the conveyor is important as too steep an angle will cause the hops, which are fairly round, to roll on the edges of the troughs and the partition plates down the conveyor. For this reason adjusting chains, or the like, such as indicated at 39 are employed as they will hold the frame B and the conveyor in any position desired.

In actual practice it has been found that some of the troughs will become filled with hops to a greater extent than others, and that some of the hops will project above the surface of the conveyor and as such are liable to be engaged by the brush 20 and thrown out. In Fig. 1 the conveyor is provided with a sloping portion 42, upon which the hops and stems are deposited, and a substantially horizontal portion 43. The horizontal disposal of the conveyor and the troughs has proven of considerable value as it permits the hops to settle to the bottom of the troughs rather than against the back walls thereof, thus reducing the chance of any hops being engaged by the brush 20 and thrown out.

A machine of this character has a large capacity; the separating action is rapid and efficient and as the mechanism employed is exceedingly simple, skilled labor is not required and while these and other features have been more or less specifically described and illustrated, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. In a separator of the character described an endless continuously traveling conveyor, a plurality of pockets formed in the upper surface of the conveyor, each pocket being of a size to receive a plurality of hops and to cause certain stems to project from the pockets and others to lie crosswise thereof, means causing a portion of the conveyor to travel in an upwardly directed inclined plane, and another portion to travel in a substantially horizontal plane, means for delivering hops to the pockets while traveling up the inclined plane so that each pocket will be only partially filled with hops and will have an opportunity to level out the hops when traveling in the horizontal plane so that the hops will lie below the surface of the pockets, and a revolving brush disposed above the horizontal portion of the conveyor to engage and sweep away the stems.

2. In a separator of the character described an inclined frame having an upper and a lower end, a shaft journaled and extending crosswise of the upper end of the frame, a second shaft journaled crosswise of the lower end of the frame, an intermediate shaft journaled crosswise of the frame and disposed substantially on the same plane as the upper shaft, an endless conveyor supported by the several shafts, the upper surface of said conveyor presenting an inclined plane between the lower and the intermediate shaft and a substantially horizontal plane between the intermediate and the upper shaft, a plurality of pockets formed in the surface of the conveyor, each pocket being of a size to receive a plurality of hops and to cause certain stems to project from the pockets and others to lie crosswise thereof, a brush disposed over the horizontal section of the conveyor to engage and sweep away the stems, and means for delivering hops to the pockets during their travel up the inclined plane so that each pocket will be only partially filled with hops and will have an opportunity to level out the hops when traveling in the horizontal plane, thereby assuming a position below the surface of the pockets and out of reach of the brush when passing under the brush.

EDOUARD THYS.